US010913314B2

(12) United States Patent
Suzuki

(10) Patent No.: US 10,913,314 B2
(45) Date of Patent: Feb. 9, 2021

(54) PNEUMATIC TIRE

(71) Applicant: The Yokohama Rubber Co., LTD., Tokyo (JP)

(72) Inventor: Naoko Suzuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 445 days.

(21) Appl. No.: 15/749,764

(22) PCT Filed: Mar. 28, 2016

(86) PCT No.: PCT/JP2016/059918
§ 371 (c)(1),
(2) Date: Feb. 1, 2018

(87) PCT Pub. No.: WO2017/043116
PCT Pub. Date: Mar. 16, 2017

(65) Prior Publication Data
US 2019/0118580 A1    Apr. 25, 2019

(30) Foreign Application Priority Data

Sep. 8, 2015   (JP) .................. 2015-177053

(51) Int. Cl.
*B60C 11/12*   (2006.01)
*B60C 11/03*   (2006.01)
(Continued)

(52) U.S. Cl.
CPC .......... *B60C 11/0302* (2013.01); *B60C 11/01* (2013.01); *B60C 11/03* (2013.01);
(Continued)

(58) Field of Classification Search
CPC ............ B60C 11/0304; B60C 11/0302; B60C 11/0306; B60C 11/1392; B60C 11/12;
(Continued)

(56) References Cited

U.S. PATENT DOCUMENTS 5,178,697 A    1/1993  Watanabe et al.
5,291,929 A    3/1994  Daisho et al.
(Continued)

FOREIGN PATENT DOCUMENTS

JP    H02-175304    7/1990
JP    H05-124406    5/1993
(Continued)

OTHER PUBLICATIONS

Machine translation for Japan 2012-006541 (Year: 2020).*
(Continued)

*Primary Examiner* — Steven D Maki
(74) *Attorney, Agent, or Firm* — Thorpe North & Western

(57) ABSTRACT

A pneumatic tire comprises a tread surface of a tread portion comprising land portions defined by three circumferential grooves extending in the tire circumferential direction and main lug grooves forming intra-land portions divided in the tire circumferential direction; the intra-land portions being divided by the laterally outer circumferential grooves, the main lug grooves, and circumferential narrow grooves to form long small land portions, which are long in the tire circumferential direction); and the intra-land portions being divided by the laterally central circumferential groove, the main lug grooves, subsidiary lug grooves, and the circumferential narrow grooves to form two short small land portions, which are short in the tire circumferential direction.

19 Claims, 8 Drawing Sheets

(51) Int. Cl.
*B60C 11/13* (2006.01)
*B60C 11/01* (2006.01)

(52) U.S. Cl.
CPC ........ *B60C 11/033* (2013.01); *B60C 11/0304* (2013.01); *B60C 11/0306* (2013.01); *B60C 11/0309* (2013.01); *B60C 11/12* (2013.01); *B60C 11/1236* (2013.01); *B60C 11/1392* (2013.01); *B60C 2011/0346* (2013.01); *B60C 2011/0348* (2013.01); *B60C 2011/0353* (2013.01); *B60C 2011/0362* (2013.01); *B60C 2011/0367* (2013.01); *B60C 2011/0369* (2013.01); *B60C 2011/0381* (2013.01); *B60C 2011/0383* (2013.01)

(58) Field of Classification Search
CPC ........ B60C 11/1236; B60C 2011/0348; B60C 2011/0346; B60C 2011/0381; B60C 2011/0383
See application file for complete search history.

(56) References Cited

U.S. PATENT DOCUMENTS

| | | | |
|---|---|---|---|
| 2010/0078105 A1* | 4/2010 | Hashimoto | B60C 11/0306 152/209.18 |
| 2010/0116392 A1* | 5/2010 | Yamakawa | B60C 11/0302 152/209.15 |
| 2011/0041972 A1* | 2/2011 | Kageyama | B60C 11/0306 152/209.15 |
| 2012/0247632 A1 | 10/2012 | Hayashi | |
| 2012/0273104 A1* | 11/2012 | Ishida | B60C 11/04 152/209.18 |
| 2016/0325590 A1* | 11/2016 | Moser | B60C 11/11 |
| 2017/0274708 A1* | 9/2017 | Suzuki | B60C 11/0302 |
| 2018/0079260 A1* | 3/2018 | Suzuki | B60C 11/0304 |

FOREIGN PATENT DOCUMENTS

| | | |
|---|---|---|
| JP | 2008-307918 | 12/2008 |
| JP | 2010-274695 | 12/2010 |
| JP | 2012-006541 A * | 1/2012 |
| JP | 2012-201335 | 10/2012 |
| KR | 2005-0047289 A * | 5/2005 |
| WO | WO 2008/152996 | 12/2008 |

OTHER PUBLICATIONS

Machine translation for Korea 2005-0047289 (Year: 2020).*
International Search Report for International Application No. PCT/JP2016/059918 dated Jun. 14, 2016, 4 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|---|
| SHAPE OF LAND PORTION (MAIN LUG GROOVE) | RIB (NO) | RIB (YES) | BLOCK (YES) | BLOCK (YES) | BLOCK (YES) | BLOCK (YES) | BLOCK (YES) | BLOCK (YES) |
| SUBSIDIARY LUG GROOVE? | NO | NO | YES | YES | YES | YES | YES | YES |
| CIRCUMFERENTIAL NARROW GROOVE? | NO | NO | YES | YES | YES | YES | YES | YES |
| SHAPE OF CIRCUMFERENTIAL NARROW GROOVE | - | - | STRAIGHT LINE | ZIGZAG | ZIGZAG | ZIGZAG | ZIGZAG | ZIGZAG |
| NARROW GROOVE? | NO | NO | NO | NO | YES | YES | YES | YES |
| TREAD SURFACE AREA RELATIONSHIP $\beta_1 + \beta_2$ TO $\alpha$ | - | - | SMALL | SMALL | SMALL | LARGE | LARGE | LARGE |
| TREAD SURFACE AREA RELATIONSHIP $\beta_1, \beta_2$ | - | - | $\beta_1 > \beta_2$ | $\beta_1 > \beta_2$ | $\beta_1 > \beta_2$ | $\beta_1 > \beta_2$ | $\beta_1 = \beta_2$ | $\beta_1 < \beta_2$ |
| CHAMFERED PORTION? (SHAPE) | NO | NO | NO | NO | NO | NO | NO | NO |
| CONFIGURATION ON TIRE EQUATORIAL PLANE | CENTRAL CIRCUMFERENTIAL GROOVE | CENTRAL CIRCUMFERENTIAL GROOVE | CENTRAL CIRCUMFERENTIAL GROOVE | CENTRAL CIRCUMFERENTIAL GROOVE | CENTRAL CIRCUMFERENTIAL GROOVE | CENTRAL CIRCUMFERENTIAL GROOVE | CENTRAL CIRCUMFERENTIAL GROOVE | CENTRAL CIRCUMFERENTIAL GROOVE |
| MAIN LUG GROOVE SHAPE | - | SAME GROOVE WIDTH | SAME GROOVE WIDTH | SAME GROOVE WIDTH | SAME GROOVE WIDTH | SAME GROOVE WIDTH | SAME GROOVE WIDTH | SAME GROOVE WIDTH |
| SUBSIDIARY LUG GROOVE SHAPE | - | - | SAME GROOVE WIDTH | SAME GROOVE WIDTH | SAME GROOVE WIDTH | SAME GROOVE WIDTH | SAME GROOVE WIDTH | SAME GROOVE WIDTH |
| GROOVE WIDTH OF NARROW GROOVE (mm) | 2 | 2 | 2 | 2 | 2 | 2 | 2 | 2 |
| BRAKING PERFORMANCE ON WET ROAD SURFACES | 100 | 100 | 103 | 103 | 103 | 104 | 104 | 104 |
| BRAKING PERFORMANCE ON SNOW-COVERED ROAD SURFACES | 100 | 100 | 103 | 103 | 103 | 104 | 104 | 104 |
| BRAKING PERFORMANCE ON DRY ROAD SURFACES | 100 | 103 | 101 | 103 | 104 | 105 | 105 | 105 |

FIG. 8

|  | EXAMPLE 7 | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|
| SHAPE OF LAND PORTION (MAIN LUG GROOVE) | BLOCK (YES) | BLOCK (YES) | BLOCK (YES) | BLOCK (YES) | BLOCK (YES) | BLOCK (YES) | BLOCK (YES) | BLOCK (YES) |
| SUBSIDIARY LUG GROOVE? | YES | YES | YES | YES | YES | YES | YES | YES |
| CIRCUMFERENTIAL NARROW GROOVE? | YES | YES | YES | YES | YES | YES | YES | YES |
| SHAPE OF CIRCUMFERENTIAL NARROW GROOVE | ZIGZAG | ZIGZAG | ZIGZAG | ZIGZAG | ZIGZAG | ZIGZAG | ZIGZAG | ZIGZAG |
| NARROW GROOVE? | YES | YES | YES | YES | YES | YES | YES | YES |
| TREAD SURFACE AREA RELATIONSHIP $\beta1 + \beta2$ TO $\alpha$ | LARGE | LARGE | LARGE | LARGE | LARGE | LARGE | LARGE | LARGE |
| TREAD SURFACE AREA RELATIONSHIP $\beta1, \beta2$ | $\beta1<\beta2$ | $\beta1<\beta2$ | $\beta1<\beta2$ | $\beta1<\beta2$ | $\beta1<\beta2$ | $\beta1<\beta2$ | $\beta1<\beta2$ | $\beta1<\beta2$ |
| CHAMFERED PORTION? (SHAPE) | YES (REVERSED) | YES (SYMMETRICAL) | YES (SYMMETRICAL) | YES (SYMMETRICAL) | YES (SYMMETRICAL) | YES (SYMMETRICAL) | YES (SYMMETRICAL) | YES (SYMMETRICAL) |
| CONFIGURATION ON TIRE EQUATORIAL PLANE | CENTRAL CIRCUMFERENTIAL GROOVE | CENTRAL CIRCUMFERENTIAL GROOVE | ONE OF LAND PORTIONS | ONE OF LAND PORTIONS | ONE OF LAND PORTIONS | ONE OF LAND PORTIONS | ONE OF LAND PORTIONS | ONE OF LAND PORTIONS |
| MAIN LUG GROOVE SHAPE | SAME GROOVE WIDTH | SAME GROOVE WIDTH | SAME GROOVE WIDTH | DECREASING WIDTH | DECREASING WIDTH | DECREASING WIDTH | DECREASING WIDTH | DECREASING WIDTH |
| SUBSIDIARY LUG GROOVE SHAPE | SAME GROOVE WIDTH | SAME GROOVE WIDTH | SAME GROOVE WIDTH | SAME GROOVE WIDTH | DECREASING WIDTH | DECREASING WIDTH | DECREASING WIDTH | DECREASING WIDTH |
| GROOVE WIDTH OF NARROW GROOVE (mm) | 2 | 2 | 2 | 2 | 2 | 0.4 | 1.2 | 0.8 |
| BRAKING PERFORMANCE ON WET ROAD SURFACES | 105 | 105 | 106 | 109 | 110 | 110 | 110 | 110 |
| BRAKING PERFORMANCE ON SNOW-COVERED ROAD SURFACES | 105 | 105 | 106 | 109 | 110 | 110 | 110 | 110 |
| BRAKING PERFORMANCE ON DRY ROAD SURFACES | 105 | 105 | 106 | 106 | 106 | 107 | 107 | 108 |

FIG. 9

PNEUMATIC TIRE

TECHNICAL FIELD

The present technology relates to a pneumatic tire that can provide enhanced braking performance on dry road surfaces, wet road surfaces, and snow-covered road surfaces.

BACKGROUND ART

In the related art, for example, the pneumatic tire described in Japanese Unexamined Patent Application Publication No. H05-124406 is designed with superior drainage efficiency when traveling straight and when cornering on wet road surfaces. This pneumatic tire includes three main grooves extending in the tire circumferential direction and two land portions adjacent in the tire lateral direction defined by the main grooves. The land portions are provided with subsidiary grooves that communicate with the main grooves at both ends and are formed as blocks.

By the land portions being formed as blocks, the edge effects improve braking performance on snow-covered road surfaces. Additionally, the subsidiary grooves that communicate with the main grooves improve drainage properties and braking performance on wet road surfaces. However, by the land portions being formed as blocks by the subsidiary grooves, block rigidity decreases, and braking performance on dry road surfaces tends to decrease. Accordingly, there is a demand for enhancements in braking performance on dry road surfaces, wet road surfaces, and snow-covered road surfaces.

SUMMARY

The present technology provides a pneumatic tire that can provide enhanced braking performance on dry road surfaces, wet road surfaces, and snow-covered road surfaces.

A pneumatic tire according to an embodiment of the present technology comprises:

a tread surface of a tread portion comprising three circumferential grooves disposed side by side in a tire lateral direction extending in a tire circumferential direction;

two land portions disposed side by side in the tire lateral direction defined by the circumferential grooves;

a plurality of main lug grooves disposed in a row in the tire circumferential direction extending so as to intersect the tire circumferential direction, the plurality of main lug grooves each communicating with a pair of the circumferential grooves adjacent in the tire lateral direction at both ends to form the land portions into blocks;

a plurality of subsidiary lug grooves disposed between pairs of the plurality of main lug grooves disposed in a row in the tire circumferential direction extending so as to intersect the tire circumferential direction, the plurality of subsidiary lug grooves each communicating with the circumferential groove located centrally at one end and terminating within the land portions at the other end; and a plurality of circumferential narrow grooves disposed in the land portions extending in the tire circumferential direction, the plurality of circumferential narrow grooves each communicating with the main lug groove at one end and communicating with the subsidiary lug groove at the other end;

the land portions being defined by the circumferential grooves and the plurality of main lug grooves to form intra-land portions divided in the tire circumferential direction;

the intra-land portions being divided by the laterally outer circumferential grooves, the plurality of main lug grooves, and the plurality of circumferential narrow grooves to form a long small land portion, which is long in the tire circumferential direction; and the intra-land portions being divided by the laterally central circumferential groove, the plurality of main lug grooves, the plurality of subsidiary lug grooves, and the plurality of circumferential narrow grooves to form two short small land portions, which are short in the tire circumferential direction.

According to the pneumatic tire, the three circumferential grooves disposed side by side in the tire lateral direction, the main lug grooves that divide the land portions into the intra-land portions in the tire circumferential direction, the subsidiary lug grooves that divide the intra-land portions, and the circumferential narrow grooves improve the drainage performance and the snow discharge performance. As a result, braking performance on wet road surfaces and snow-covered road surfaces can be enhanced. Furthermore, the short small land portions disposed proximal to the laterally central circumferential groove reduced the rigidity of the land portions, and the long small land portions disposed proximal to the laterally outer circumferential grooves ensure the rigidity of the land portions. As a result, traction performance is improved, and braking performance on dry road surfaces can be enhanced.

A pneumatic tire according an embodiment of the present technology has the configuration wherein the plurality of circumferential narrow grooves comprise a first circumferential narrow groove that communicates with the main lug groove partway along at one end and communicates with the subsidiary lug groove partway along at the other end, and a second circumferential narrow groove that communicates with the main lug groove partway along at one end and communicates with the subsidiary lug groove at a terminating end thereof at the other end;

one end of the first circumferential narrow groove and one end of the second circumferential narrow groove face one another and communicate via the main lug groove; and the first circumferential narrow groove and the second circumferential narrow groove include a portion of the subsidiary lug groove and have a zigzag shape in the tire circumferential direction.

According to the pneumatic tire, by the circumferential narrow grooves having a zigzag shape in the tire circumferential direction, collapse of the land portions in the tire lateral direction can be prevented. As a result, braking performance on dry road surfaces can be enhanced. Moreover, the edge effects are improved by the zigzag shape, so the effect of enhancing braking performance on snow-covered road surfaces can be reinforced.

A pneumatic tire according an embodiment of the present technology has the configuration wherein the intra-land portions comprise a narrow groove in the tread surface of the long small land portion.

According to the pneumatic tire, the narrow grooves suppress an extreme difference in rigidity between the long small land portions and the short small land portions. As a result, traction performance is maintained and braking performance on dry road surfaces can be further enhanced.

A pneumatic tire according an embodiment of the present technology has the configuration wherein in the intra-land portions, a relationship $\alpha \leq \beta 1 + \beta 2$ is satisfied, where $\alpha$ is a tread surface area of the long small land portion, and $\beta 1$, $\beta 2$ are tread surface areas of the short small land portions.

According to the pneumatic tire, the sum of the tread surface areas β1, β2 is equal to or greater than the tread surface area α of the long small land portion. As a result, a decrease in rigidity in the region around the laterally central circumferential groove is suppressed and traction performance is improved. Thus, the effect of enhancing braking performance on dry road surfaces can be improved.

A pneumatic tire according an embodiment of the present technology has the configuration wherein a rotation direction when the tire is mounted on a vehicle is designated; and in the intra-land portions, a relationship β1≤β2 is satisfied, where the tread surface area β1 of the short small land portion is on a leading side, and the tread surface area β2 is on a trailing side.

According to the pneumatic tire, the tread surface area β1 of the short small land portions on the leading side is equal to or less than the tread surface area β2 of the short small land portions on the trailing side. As a result, traction performance is improved, thus the effect of enhancing braking performance on dry road surfaces can be improved.

A pneumatic tire according an embodiment of the present technology further comprises chamfered portions on opening edges of the laterally central circumferential groove between pairs of the main lug grooves adjacent in the tire circumferential direction, the chamfered portions changing positions of the opening edges diagonally in the tire circumferential direction.

According to the pneumatic tire, by chamfered portions changing the position of the opening edges of the laterally central circumferential groove diagonally in the tire circumferential direction, the edge effects can be improved and braking performance on snow-covered road surfaces can be enhanced.

A pneumatic tire according an embodiment of the present technology has the configuration wherein one of the land portions is disposed on the tire equatorial plane.

According to the pneumatic tire, in an embodiment with an asymmetrical pattern, the laterally central circumferential groove is disposed off the tire equatorial plane, one of the land portions is disposed on the tire equatorial plane, and the other land portion is disposed adjacent thereto in the tire lateral direction. As a result, the effect of enhancing braking performance on dry road surfaces, wet road surfaces, and snow-covered road surfaces can be obtained.

A pneumatic tire according an embodiment of the present technology has the configuration wherein the plurality of main lug grooves decrease in groove width toward the laterally central circumferential groove.

According to the pneumatic tire, the change in groove width improves snow discharge performance. As a result, the effect of enhancing braking performance on snow-covered road surfaces can be improved.

A pneumatic tire according an embodiment of the present technology has the configuration wherein the plurality of subsidiary lug grooves decrease in groove width toward the laterally central circumferential groove.

According to the pneumatic tire, the change in groove width improves snow discharge performance. As a result, the effect of enhancing braking performance on snow-covered road surfaces can be improved.

A pneumatic tire according an embodiment of the present technology has the configuration wherein end portions of the plurality of main lug grooves that communicate with the laterally central circumferential groove are offset in position in the tire circumferential direction.

A pneumatic tire according an embodiment of the present technology has the configuration wherein end portions of the plurality of subsidiary lug grooves that communicate with the laterally central circumferential groove are offset in position in the tire circumferential direction.

A pneumatic tire according an embodiment of the present technology has the configuration wherein the narrow grooves have a groove width ranging from 0.4 mm to 1.2 mm.

According to the pneumatic tire, the narrow grooves are formed as so-called sipes. As a result, the edge effects are improved, and the effect of improving braking performance on snow-covered road surfaces can be reinforced.

A pneumatic tire according to an embodiment of the present technology can provide enhanced braking performance on dry road surfaces, wet road surfaces, and snow-covered road surfaces.

BRIEF DESCRIPTION OF DRAWINGS

FIG. 8 is a table showing the results of performance tests of pneumatic tires according to Examples of the present technology.

FIG. 9 is a table showing the results of performance tests of pneumatic tires according to Examples of the present technology.

DETAILED DESCRIPTION

Embodiments of the present technology are described in detail below based on the drawings. However, the present technology is not limited to these embodiments. Constituents of the embodiments include elements that are essentially identical or that can be substituted or easily conceived by a person skilled in the art. Furthermore, the modified examples described in the embodiments can be combined as desired within the scope apparent to those skilled in the art.

Figure 1:
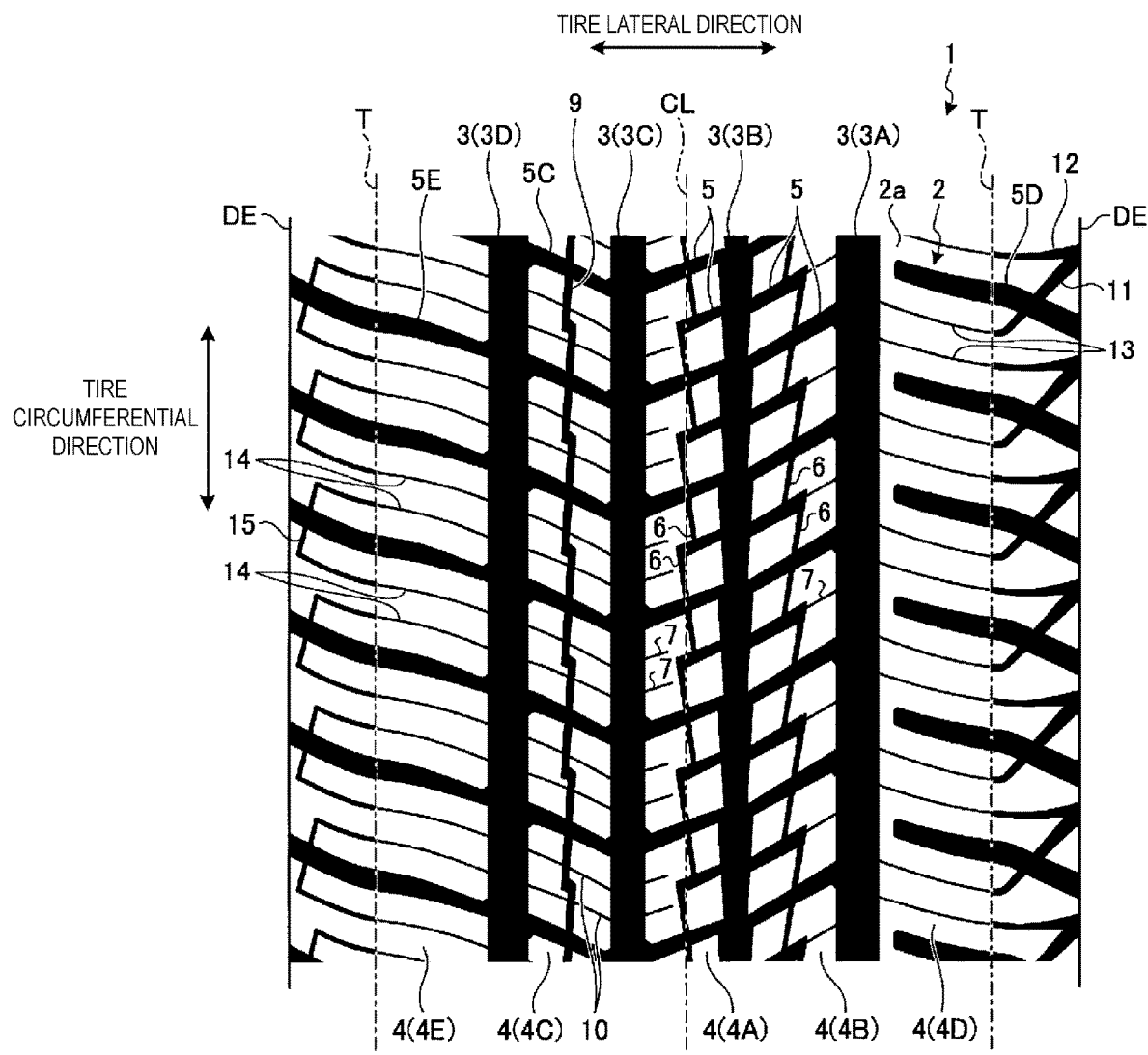
FIG. 1 is a plan view of a tread portion of a pneumatic tire according to an embodiment of the present technology.

FIG. 1 is a plan view of a tread portion of a pneumatic tire according to the present embodiment.

Herein, "tire circumferential direction" refers to the circumferential direction with the tire rotation axis (not illustrated) of a pneumatic tire 1 as the center axis. "Tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. Furthermore, "tire radial direction" refers to the direction orthogonal to the rotation axis. "Inward in the tire radial direction" refers to the direction toward the rotation axis in the tire radial direction. "Outward in the tire radial direction" refers to the direction away from the rotation axis in the tire radial direction. "Tire equatorial plane CL" is the plane orthogonal to the rotation axis that passes through the center of the tire width of the pneumatic tire 1. "Tire equator line" refers to the line along the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2. The tread portion 2 is formed from a rubber material, is exposed on the outermost side in the tire radial direction of the pneumatic tire 1, and the surface thereof constitutes the profile of the pneumatic tire 1 as a tread surface 2a.

The tread portion 2 includes a plurality of circumferential grooves 3 (four in the present embodiment) extending in the tire circumferential direction. The circumferential grooves 3 are disposed side by side in the tire lateral direction in the tread surface 2a. In the present embodiment, the circumferential groove 3 on one side in the tire lateral direction (right side of FIG. 1) is referred to as a first circumferential groove 3A, and the circumferential grooves 3 from the first circumferential groove 3A toward to other side in the tire lateral direction (left side of FIG. 1) are a second circumferential groove 3B, a third circumferential groove 3C, and a fourth circumferential groove 3D in that order. Additionally, the first circumferential groove 3A and the second circumferential groove 3B are disposed outward of the tire equatorial plane CL in the tire lateral direction on one side (right side of FIG. 1), and the third circumferential groove 3C and the fourth circumferential groove 3D are disposed outward of the tire equatorial plane CL in the tire lateral direction on the other side (left side of FIG. 1). Note that the circumferential grooves 3 have, for example, a groove width ranging from 5 mm to 15 mm, and a groove depth (dimension from the opening position on the tread surface 2a to the groove bottom) ranging from 5 mm to 15 mm.

A plurality of land portions 4 (five in the present embodiment) are defined on the tread surface 2a of the tread portion 2 by the circumferential grooves 3. In the present embodiment, the land portion 4 on the tire equatorial plane CL between the second circumferential groove 3B and the third circumferential groove 3C is referred to as a center land portion 4A. The land portion 4 located between the first circumferential groove 3A and the second circumferential groove 3B and located outwardly adjacent to the center land portion 4A in the tire lateral direction on one side is referred to as a first intermediate land portion 4B. The land portion 4 located between the third circumferential groove 3C and the fourth circumferential groove 3D and located outwardly adjacent to the center land portion 4A in the tire lateral direction on the other side is referred to as a second intermediate land portion 4C. The land portion 4 located outward of the first circumferential groove 3A in the tire lateral direction and outwardly adjacent to the first intermediate land portion 4B and located outermost in the tire lateral direction is referred to as a first shoulder land portion 4D. The land portion 4 located outward of the fourth circumferential groove 3D in the tire lateral direction and outwardly adjacent to the second intermediate land portion 4C and located outermost in the tire lateral direction is referred to as a second shoulder land portion 4E.

The ground contact edges T of the tread portion 2 are located in the outermost land portions 4 in the tire lateral direction, i.e., the first shoulder land portion 4D and the second shoulder land portion 4E. In the tread portion 2, the laterally outer ends of the outermost land portions 4 in the tire lateral direction, i.e., the first shoulder land portion 4D and the second shoulder land portion 4E, are referred to as design ends DE.

"Ground contact edge T" refers to the outermost edges of the ground contact region in the tire lateral direction. In FIG. 1, the ground contact edges T are illustrated as continuing in the tire circumferential direction. The ground contact region is the region where the tread surface 2a of the tread portion 2 of the pneumatic tire 1 comes into contact with a dry, flat road surface, when the pneumatic tire 1 is mounted on a regular rim, inflated to the regular internal pressure, and loaded with 70% of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO. "Design end DE" refers to the outermost edges in the tire lateral direction of the tread portion 2 outward from the ground contact edges T in the tire lateral direction and the laterally outermost end of grooves formed in the tread portion 2. In FIG. 1, the design ends DE are illustrated as continuing in the tire circumferential direction. In other words, the regions of the tread portion 2 from the ground contact edges T toward the design ends DE do not normally come into contact with a dry, flat road surface.

Figure 2:
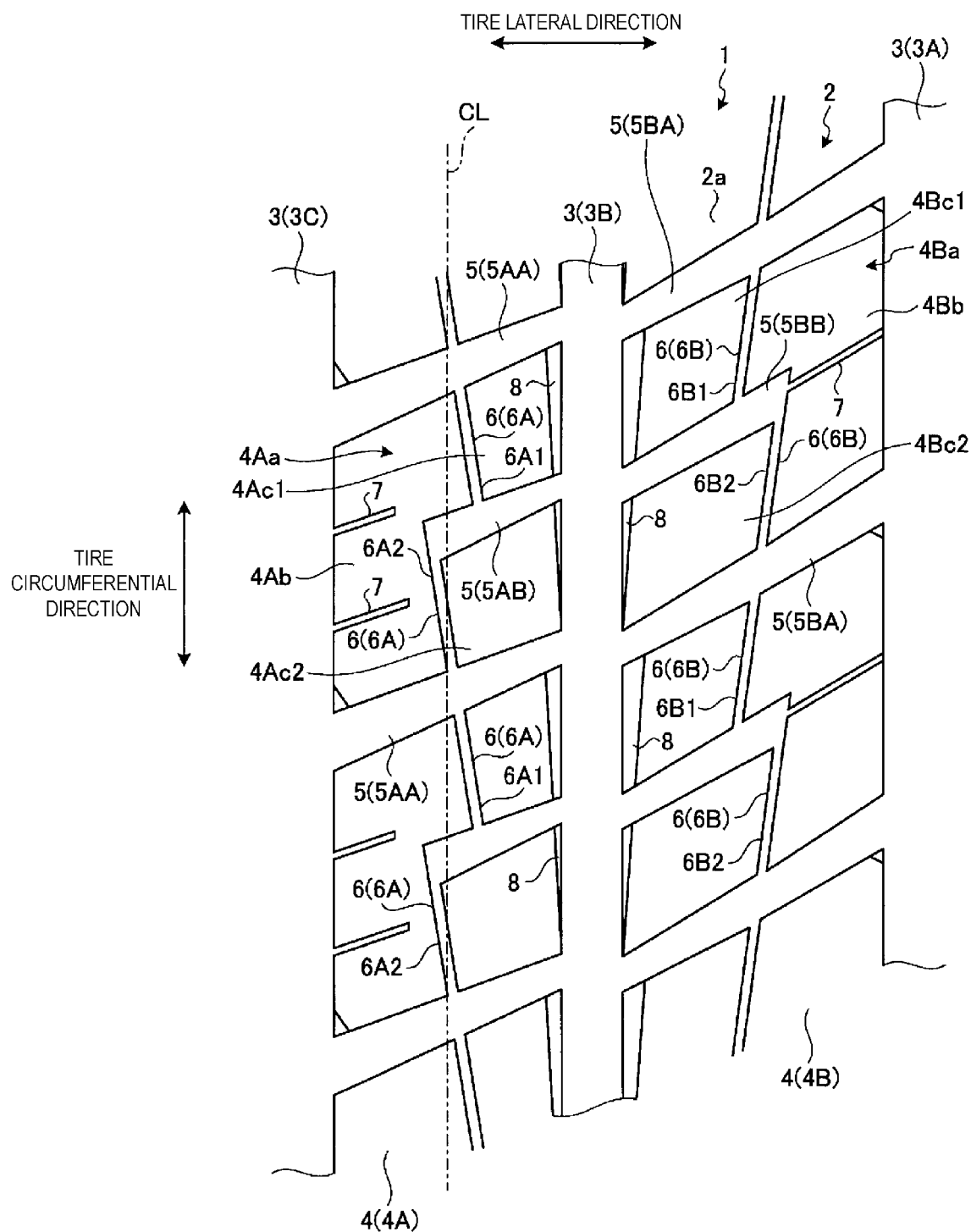
FIG. 2 is an enlarged plan view of a portion of a tread portion of a pneumatic tire according to an embodiment of the present technology.
Figure 3:
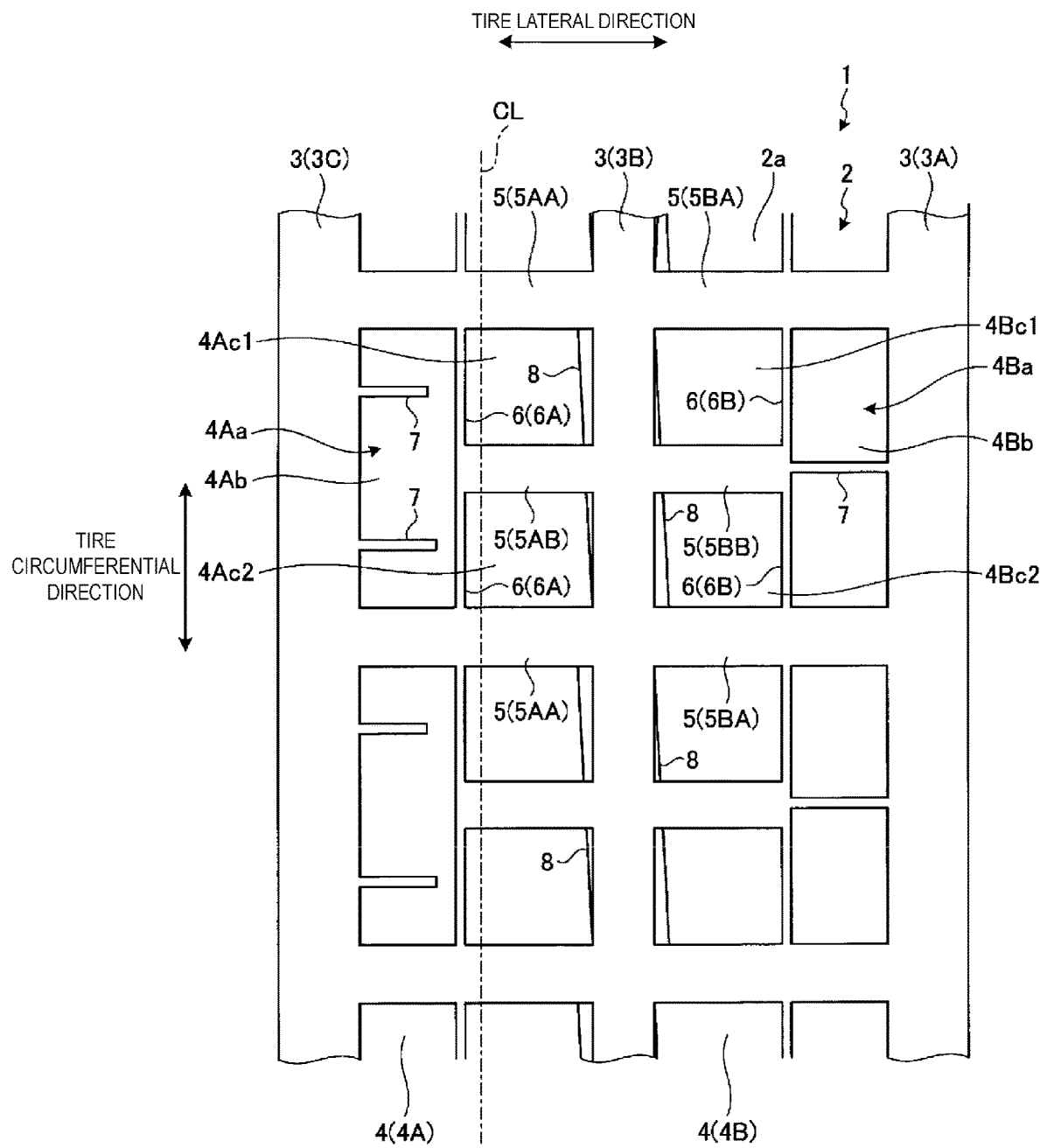
FIG. 3 is an enlarged plan view of a portion of a tread portion of a pneumatic tire according to an embodiment of the present technology.

FIGS. 2 and 3 are enlarged plan views of a portion of the tread portion of the pneumatic tire according to the present embodiment.

As illustrated in FIGS. 2 and 3, from the configuration described above, the pneumatic tire 1 of the present embodiment has a specific configuration that includes the three circumferential grooves 3, the first circumferential groove 3A, the second circumferential groove 3B, and the third circumferential groove 3C, and the two land portions 4 (the center land portion 4A and the first intermediate land portion 4B) defined by the circumferential grooves 3A, 3B, 3C and located side by side in the tire lateral direction.

As illustrated in FIGS. 2 and 3, the center land portion 4A and the first intermediate land portion 4B are provided with lug grooves 5 and circumferential narrow grooves 6 in the tread surface 2a.

The lug grooves 5 include center land portion main lug grooves 5AA and center land portion subsidiary lug grooves 5AB disposed in the center land portion 4A. Additionally, the lug grooves 5 include first intermediate land portion main lug grooves 5BA and first intermediate land portion subsidiary lug grooves 5BB disposed in the first intermediate land portion 4B. Note that the center land portion main lug grooves 5AA and the first intermediate land portion main lug grooves 5BA may be collectively referred to as main lug grooves. The center land portion subsidiary lug grooves 5AB and the first intermediate land portion subsidiary lug grooves 5BB may be collectively referred to as subsidiary lug grooves. The lug grooves 5 refer to grooves that have a groove width from 1.5 mm to less than that of the circumferential grooves 3, and a groove depth less than that of the circumferential grooves 3, for example.

A plurality of the main lug grooves 5AA, 5BA are disposed in rows in the tire circumferential direction extending so as to intersect the tire circumferential direction. The main lug grooves 5AA, 5BA communicate with the circumferential grooves 3, i.e., the first circumferential groove 3A, the second circumferential groove 3B, and the third circumferential groove 3C, adjacent in the tire lateral direction, at both ends and form the land portions 4 into blocks. Specifically, the center land portion main lug grooves 5AA communicates with the second circumferential groove 3B and the third circumferential groove 3C at both ends and form the center land portion 4A into blocks. The first intermediate land portion main lug grooves 5BA communicate with the first circumferential groove 3A and the second circumferential groove 3B at both ends and form the first intermediate land portion 4B into blocks.

The subsidiary lug grooves 5AB, 5BB are disposed between the main lug grooves 5AA, 5BA disposed in rows in the tire circumferential direction and extend so as to intersect the tire circumferential direction. The subsidiary lug grooves 5AB, 5BB communicate with the central circumferential groove 3, i.e., the second circumferential groove 3B, at one end and terminate within the land portion 4 at the other end. Specifically, the center land portion subsidiary lug grooves 5AB communicate with the second circumferential groove 3B at one end and terminate within the center land portion 4A at the other end without reaching the third circumferential groove 3C. The first intermediate land portion subsidiary lug grooves 5BB communicate with the second circumferential groove 3B at one end and terminate within the first intermediate land portion 4B at the other end without reaching the first circumferential groove 3A.

The circumferential narrow grooves 6 are disposed in the land portions 4 extending in the tire circumferential direction. The circumferential narrow grooves 6 communicate with the main lug grooves 5AA, 5BA at one end and communicate with the subsidiary lug grooves 5AB, 5BB at the other end. Specifically, the circumferential narrow grooves 6 include center land portion circumferential narrow grooves 6A provided in the center land portion 4A and first intermediate land portion circumferential narrow grooves 6B provided in the first intermediate land portion 4B. The center land portion circumferential narrow grooves 6A extend in the tire circumferential direction in the center land portion 4A, communicate with the center land portion main lug grooves 5AA at one end, and communicate with the center land portion subsidiary lug grooves 5AB at the other end. The first intermediate land portion circumferential narrow grooves 6B extend in the tire circumferential direction in the first intermediate land portion 4B, communicate with the first intermediate land portion main lug grooves 5BA at one end, and communicate with the first intermediate land portion subsidiary lug grooves 5BB at the other end. The circumferential narrow grooves 6 refer to grooves that have a groove width less than that of the circumferential grooves 3 and the lug grooves 5 ranging from 0.4 mm to 1.5 mm, and a groove depth less than that of the circumferential grooves 3 and the lug grooves 5, for example.

The pneumatic tire 1 of the present embodiment includes intra-land portions formed by the land portions 4 being separated in the tire circumferential direction and defined by the circumferential grooves 3 and the main lug grooves 5AA, 5BA. Specifically, the second circumferential groove 3B, the third circumferential groove 3C, and the center land portion main lug grooves 5AA define the center land portion 4A into block-like intra-land portions 4Aa separated in the tire circumferential direction. The first circumferential groove 3A, the second circumferential groove 3B, and the first intermediate land portion main lug grooves 5BA define the first intermediate land portion 4B into block-like intra-land portions 4Ba separated in the tire circumferential direction.

In the pneumatic tire 1 of the present embodiment, the laterally outer circumferential grooves 3, the main lug grooves 5AA, 5BA, and the circumferential narrow grooves 6 divide the intra-land portions to form long small land portions, which are long in the tire circumferential direction. Specifically, the laterally outer third circumferential groove 3C, the center land portion main lug grooves 5AA, and the center land portion circumferential narrow grooves 6A divide the intra-land portions 4Aa in the tire lateral direction to form long small land portions 4Ab, which are long in the tire circumferential direction. The laterally outer first circumferential groove 3A, the first intermediate land portion main lug grooves 5BA, and the first intermediate land portion circumferential narrow grooves 6B define the intra-land portions 4Ba to form long small land portions 4Bb, which are long in the tire circumferential direction.

In the pneumatic tire 1 of the present embodiment, the laterally central circumferential groove 3, the main lug grooves 5AA, 5BA, the subsidiary lug grooves 5AB, 5BB, and the circumferential narrow grooves 6 divide the intra-land portions to form two short small land portions, which are short in the tire circumferential direction. Specifically, the laterally central second circumferential groove 3B, the center land portion main lug grooves 5AA, the center land portion subsidiary lug grooves 5AB, and the center land portion circumferential narrow grooves 6A divide the intra-land portions 4Aa in the tire lateral direction and the tire circumferential direction to form two short small land portions 4Ac1, 4Ac2, which are short in the tire circumferential direction. The laterally central second circumferential groove 3B, the first intermediate land portion main lug grooves 5BA, the first intermediate land portion subsidiary lug grooves 5BB, and the intermediate land portion circumferential narrow grooves 6B divide the intra-land portions 4Ba in the tire lateral direction and the tire circumferential direction to form two short small land portions 4Bc1, 4Bc2, which are short in the tire circumferential direction.

As illustrated in FIGS. 2 and 3, in such a manner, the pneumatic tire 1 of the present embodiment include the tread surface 2a of the tread portion 2 provided with three circumferential grooves 3 (3A, 3B, 3C) extending in the tire circumferential direction; two land portions 4 (4A, 4B) defined by the circumferential grooves 3A, 3B, 3C disposed side by side in the tire lateral direction; the plurality of main lug grooves 5AA, 5BA disposed in rows in the tire circumferential direction and extending so as to intersect the tire circumferential direction, the main lug grooves 5AA, 5BA communicating with the circumferential grooves 3 (3A, 3B and 3B, 3C) adjacent in the tire lateral direction at both bends to form the land portions 4 (4A, 4B) into blocks; the subsidiary lug grooves 5AB, 5BB disposed between the main lug grooves 5AA and between the main lug grooves 5BA disposed in rows in the tire circumferential direction and extending so as to intersect the tire circumferential direction, the subsidiary lug grooves 5AB, 5BB communicating with the central circumferential groove 3 (3B) at one end and terminating within the land portions 4 (4A, 4B) at the other end; and circumferential narrow grooves 6 (6A, 6B) extending in the tire circumferential direction in the land portions 4 (4A, 4B), the circumferential narrow grooves 6 communicating with the main lug grooves 5AA, 5BA at one end and communicating with the subsidiary lug grooves 5AB, 5BB at the other end. The land portions 4A, 4B are defined by the circumferential grooves 3A, 3B, 3C and the main lug grooves 5AA, 5BA to form intra-land portions 4Aa, 4Ba divided in the tire circumferential direction. The intra-land portions 4Aa, 4Ba are divided by the laterally outer circumferential grooves 3A, 3C, the main lug grooves 5AA, 5BA, and the circumferential narrow grooves 6A, 6B to form the long small land portions 4Ab, 4Bb, which are long in the tire circumferential direction; and the intra-land portions 4Aa, 4Ba are divided by the laterally central circumferential groove 3B, the main lug grooves 5AA, 5BA, the subsidiary lug grooves 5AB, 5BB, and the circumferential narrow grooves 6A, 6B to form the two short small land portions 4Ac1, 4Ac2, 4Bc1, 4Bc2, which are short in the tire circumferential direction.

According to the pneumatic tire 1, the three circumferential grooves 3A, 3B, 3C disposed side by side in the tire lateral direction, the main lug grooves 5AA, 5BA that divide the land portions 4A, 4B into the intra-land portions 4Aa, 4Ba in the tire circumferential direction, the subsidiary lug grooves 5AB, 5BB that divide the intra-land portions 4Aa, 4Ba, and the circumferential narrow grooves 6A, 6B improve the drainage performance and the snow discharge performance. As a result, braking performance on wet road surfaces and snow-covered road surfaces can be enhanced. Furthermore, the short small land portions 4Ac1, 4Ac2, 4Bc1, 4Bc2 disposed proximal to the laterally central circumferential groove 3B reduced the rigidity of the land portions 4A, 4B, and the long small land portions 4Ab, 4Bb disposed proximal to the laterally outer circumferential grooves 3A, 3C ensure the rigidity of the land portions 4A, 4B. As a result, traction performance is improved, and braking performance on dry road surfaces can be enhanced.

As illustrated in FIG. 2, in the pneumatic tire 1 of the present embodiment, the circumferential narrow grooves 6A, 6B include first circumferential narrow grooves 6A1, 6B1 that communicate with the main lug grooves 5AA, 5BA partway along at one end and communicate with the subsidiary lug grooves 5AB, 5BB partway along at the other end; and second circumferential narrow grooves 6A2, 6B2 that communicate with the main lug grooves 5AA, 5BA partway along and communicate with the subsidiary lug grooves 5AB, 5BB at the terminating ends at the other end. One end of the first circumferential narrow grooves 6A1, 6B1 and one end of the second circumferential narrow grooves 6A2, 6B2 face one another and communicate via the main lug grooves 5AA, 5BA. The first circumferential narrow grooves 6A1, 6B1 and the second circumferential narrow grooves 6A2, 6B2 include a portion of the subsidiary lug grooves 5AB, 5BB and have a continuous zigzag shape of a straight line in the tire circumferential direction being bent by some degree to form a lightning-like shape.

According to the pneumatic tire 1, by the circumferential narrow grooves 6A, 6B having a zigzag shape in the tire circumferential direction, collapse of the land portions 4 in the tire lateral direction can be prevented. As a result, braking performance on dry road surfaces can be enhanced. Moreover, the edge effects are improved by the zigzag shape, so the effect of enhancing braking performance on snow-covered road surfaces can be reinforced.

As illustrated in FIGS. 2 and 3, in the pneumatic tire 1 of the present embodiment, the intra-land portions 4Aa 4Ba include narrow grooves 7 in the tread surface 2a of the long small land portions 4Ab, 4Bb.

The narrow grooves 7 in the intra-land portions 4Aa of the center land portion 4A communicate with the laterally outer third circumferential groove 3C at one end and terminate within the intra-land portions 4Aa at the other end. The narrow grooves 7 in the intra-land portions 4Ba of the first intermediate land portion 4B communicate with the laterally outer first circumferential groove 3A at one end and communicate with the terminating end of the first intermediate land portion subsidiary lug grooves 5BB at the other end. The narrow grooves 7 refer to grooves that have a groove width less than that of the circumferential grooves 3 and the lug grooves 5 ranging from 0.4 mm to 1.5 mm, and a groove depth less than that of the circumferential grooves 3 and the lug grooves 5, for example. In the intra-land portions 4Ba of the first intermediate land portion 4B, the narrow groove 7 communicates with the terminating end of the first intermediate land portion subsidiary lug groove 5BB, but has a groove width less than that the first intermediate land portion subsidiary lug groove 5BB. As a result, communication at the same width with the first intermediate land portion subsidiary lug groove 5BB is prevented and the terminating end of the first intermediate land portion subsidiary lug groove 5BB is made clear within the intra-land portion 4Ba.

According to the pneumatic tire 1, the narrow grooves 7 suppress an extreme difference in rigidity between the long small land portions 4Ab, 4Bb and the short small land portions 4Ac1, 4Ac2, 4Bc1, 4Bc2. As a result, traction performance is maintained and braking performance on dry road surfaces can be further enhanced.

Note that the narrow grooves 7 extending so as to intersect the tire circumferential direction. As a result, gripping force is improved, and braking performance on snow-covered road surfaces is improved, which is preferable.

As illustrated in FIGS. 2 and 3, in the pneumatic tire 1 of the present embodiment, in the intra-land portions 4Aa, the relationship $\alpha \le \beta 1 + \beta 2$ is satisfied, where $\alpha$ is the tread surface area of the long small land portion 4Ab, and $\beta 1$, $\beta 2$ are the tread surface areas of the short small land portions 4Ac1, 4Ac2. In the intra-land portions 4Ba, the relationship $\alpha \le \beta 1 + \beta 2$ is satisfied, where $\alpha$ is the tread surface area of the long small land portion 4Bb, and $\beta 1$, $\beta 2$ are the tread surface areas of the short small land portions 4Bc1, 4Bc2.

Herein, the tread surface area is the area of the tread surface $2a$ including the groove opening area of the narrow grooves 7, when the tread surface $2a$ of the tread portion 2 of the pneumatic tire 1 comes into contact with a dry, flat road surface, when the pneumatic tire 1 is mounted on a regular rim, inflated to the regular internal pressure, and loaded with 70% of the regular load.

According to the pneumatic tire 1, the sum of the tread surface areas $\beta 1$, $\beta 2$ of the short small land portion 4Ac1, 4Ac2 or the short small land portions 4Bc1, 4Bc2 is equal to or greater than the tread surface area $\alpha$ of the long small land portion 4Ab or the long small land portion 4Bb. As a result, a decrease in rigidity in the region around the laterally central second circumferential groove 3B is suppressed and traction performance is improved. Thus, the effect of enhancing braking performance on dry road surfaces is improved.

Note that to ensure a balance in rigidity of the land portions, $\alpha$ and $\beta 1 + \beta 2$ are preferably equal. Thus, the relationship between $\alpha$, $\beta 1$, and $\beta 2$ is preferably in the range $0.7 \le \alpha/(\beta 1 + \beta 2) \le 1.0$.

In the pneumatic tire 1 of the present embodiment, the rotation direction when the tire is mounted on the vehicle is designed. As illustrated in FIG. 2, in the intra-land portions 4Aa, the short small land portion 4Ac1 on the tread surface area β1 side is on the leading side, and the short small land portion 4Ac2 on the tread surface area β2 is on the trailing side. The relationship β1≤β2 is satisfied. The rotation direction when the tire is mounted on the vehicle is designed. As illustrated in FIG. 2, in the intra-land portions 4Ba, the short small land portion 4Bc1 on the tread surface area β1 side is on the leading side, and the short small land portion 4Bc2 on the tread surface area β2 is on the trailing side. The relationship β1≤β2 is satisfied.

Herein, the rotation direction designation, though not illustrated in the drawings, is indicated via an indicator (an arrow facing the forward direction of the vehicle) provided all sidewall portions on the side surface of the tire, i.e. the outer side of the tread portion 2 in the tire lateral direction, for example.

According to the pneumatic tire 1, the tread surface area β1 of the short small land portions 4Ac1, 4Bc1 on the leading side is equal to or less than the tread surface area β2 of the short small land portions 4Ac2, 4Bc2 on the trailing side. As a result, traction performance is improved, thus the effect of enhancing braking performance on dry road surfaces is improved.

Note that to ensure a balance in rigidity of the land portions, β1 and β2 are preferably equal. Thus, the relationship between β1 and β2 is preferably in the range 0.7≤β1/β2≤1.0.

As illustrated in FIGS. 2 and 3, in the pneumatic tire 1 of the present embodiment, the opening edges of the laterally central second circumferential groove 3B between the main lug grooves 5AA, 5BA adjacent in the tire circumferential direction are provided with chamfered portions 8. The chamfered portions 8 change the position of the opening edges diagonally in the tire circumferential direction.

The chamfered portions 8 illustrated in FIG. 2 are provided to increase or decrease in the width direction the position of the facing opening edges of the second circumferential groove 3B in the same direction in the tire circumferential direction. The chamfered portions 8 are symmetrical in the tire lateral direction, and the opening edges are shaped like a wedge, tapering or growing in the tire circumferential direction. The chamfered portions 8 illustrated in FIG. 3 are provided to increase or decrease in the width direction the position of the facing opening edges of the second circumferential groove 3B in the opposite direction in the tire circumferential direction. The chamfered portions 8 are reversed in the tire circumferential direction, and the opening edges have a continuous zigzag shape of a straight line in the tire circumferential direction being bent by some degree to form a lightning-like shape.

According to the pneumatic tire 1, by chamfered portions 8 changing the position of the opening edges of the laterally central second circumferential groove 3B diagonally in the tire circumferential direction, the edge effects can be improved and braking performance on snow-covered road surfaces can be enhanced.

As illustrated in FIGS. 1 to 3, in the pneumatic tire 1 of the present embodiment, one of the land portions 4A, 4B is disposed on the tire equatorial plane CL.

According to the pneumatic tire 1, in an embodiment with an asymmetrical pattern, the laterally central second circumferential groove 3B is disposed off the tire equatorial plane CL, one of the land portions 4A, 4B is disposed on the tire equatorial plane CL, and the other land portion 4A, 4B is disposed adjacent thereto in the tire lateral direction. As a result, the effect of enhancing braking performance on dry road surfaces, wet road surfaces, and snow-covered road surfaces can be obtained.

As illustrated in FIG. 2, in the pneumatic tire 1 of the present embodiment, the main lug grooves 5AA, 5BA decrease in groove width toward the laterally central second circumferential groove 3B.

According to the pneumatic tire 1, the change in groove width improves snow discharge performance. As a result, the effect of enhancing braking performance on snow-covered road surfaces can be improved.

As illustrated in FIG. 2, in the pneumatic tire 1 of the present embodiment, the subsidiary lug grooves 5AB, 5BB decrease in groove width toward the laterally central second circumferential groove 3B.

According to the pneumatic tire 1, the change in groove width improves snow discharge performance. As a result, the effect of enhancing braking performance on snow-covered road surfaces can be improved.

As illustrated in FIG. 2, in the pneumatic tire 1 of the present embodiment, the end portions of the main lug grooves 5AA, 5BA that communicate with the laterally central second circumferential groove 3B may be offset in position in the tire circumferential direction.

The configuration illustrated in FIG. 3 in which the end portions of the main lug grooves 5AA, 5BA have the same position in the tire circumferential direction can obtained the same effect as the configuration illustrated in FIG. 2 in which the end portions are offset in position in the tire circumferential direction.

Note that by the offset in position of the main lug grooves 5AA, 5BA in the tire circumferential direction being such that from 75% to less than 100% of the circumferential dimension of the intra-land portions 4Aa, 4Ba on either side of the laterally central second circumferential groove 3B face one another in the tire lateral direction, an excessive difference in rigidity between the land portions 4A, 4B interposed by the laterally central second circumferential groove 3B can be suppressed, traction performance can be maintained, and braking performance on dry road surfaces can be further enhanced. Note that in a configuration in which 100% of the circumferential dimension of the intra-land portions 4Aa, 4Ba on either side of the laterally central second circumferential groove 3B face one another in the tire lateral direction, as illustrated in FIG. 3, the positions of the end portions of the main lug grooves 5AA, 5BA in the tire circumferential direction match and face one another in the tire lateral direction.

In the pneumatic tire 1 of the present embodiment, the end portions of the subsidiary lug grooves 5AB, 5BB that communicate with the laterally central second circumferential groove 3B may be offset in position in the tire circumferential direction.

The configuration illustrated in FIG. 3 in which the end portions of the subsidiary lug grooves 5AB, 5BB have the same position in the tire circumferential direction can obtained the same effect as the configuration illustrated in FIG. 2 in which the end portions are offset in position in the tire circumferential direction.

Note that by the offset in position of the subsidiary lug grooves 5AB, 5BB in the tire circumferential direction being such that from 75% to less than 100% of the circumferential dimension of the short small land portions 4Ac1, 4Bc1 (4Ac2, 4Bc2) on either side of the laterally central second circumferential groove 3B face one another in the tire lateral direction, an excessive difference in rigidity between the land portions 4A, 4B interposed by the laterally central second circumferential groove 3B can be suppressed, traction performance can be maintained, and braking performance on dry road surfaces can be further enhanced. Note that in a configuration in which 100% of the circumferential dimension of the short small land portions 4Ac1, 4Bc1 (4Ac2, 4Bc2) on either side of the laterally central second circumferential groove 3B face one another in the tire lateral direction, as illustrated in FIG. 3, the positions of the end portions of the subsidiary lug grooves 5AB, 5BB in the tire circumferential direction match and face one another in the tire lateral direction.

Additionally, in the pneumatic tire 1 of present embodiment, the narrow grooves 6, 7 have a groove width ranging from 0.4 mm to 1.2 mm.

According to the pneumatic tire 1, the narrow grooves 6, 7 are formed as so-called sipes. As a result, the edge effects are improved, and the effect of improving braking performance on snow-covered road surfaces can be reinforced.

As illustrated in FIG. 2, in the pneumatic tire 1 of the present embodiment, the main lug grooves 5AA, 5BA, the subsidiary lug grooves 5AB, 5BB, and the narrow grooves 7 are preferably inclined with respect to the tire lateral direction. According to such a configuration, the edge effects are improved, and the effect of improving braking performance on snow-covered road surfaces can be reinforced.

A preferable tread portion 2 of the pneumatic tire 1 of the present embodiment will be described. As illustrated in FIG. 1, the pneumatic tire 1 of the present embodiment, as well as having the configuration described above, has a specific configuration including the second intermediate land portion 4C defined by the third circumferential groove 3C and the fourth circumferential groove 3D, the first shoulder land portion 4D located outward of the first circumferential groove 3A in the tire lateral direction, and the second shoulder land portion 4E located outward of the fourth circumferential groove 3D in the tire lateral direction.

As illustrated in FIG. 1, the second intermediate land portion 4C is provided with second intermediate land portion lug grooves 5C, a second intermediate land portion circumferential narrow groove 9, and second intermediate land portion narrow grooves 10.

The second intermediate land portion lug grooves 5C are disposed in a row in the tire circumferential direction and extending so as to intersect the tire circumferential direction. The second intermediate land portion lug grooves 5C communicate with the third circumferential groove 3C and the fourth circumferential groove 3D adjacent in the tire lateral direction at both ends and form the second intermediate land portion 4C into blocks. The second intermediate land portion lug grooves 5C refer to grooves that have a groove width from 1.5 mm to less than that of the circumferential grooves 3, and a groove depth less than that of the circumferential grooves 3, for example.

The second intermediate land portion circumferential narrow groove 9 has a continuous zigzag shape of a straight line in the tire circumferential direction being bent by some degree to form a lightning-like shape. The second intermediate land portion circumferential narrow groove 9 refers to a groove that have a groove width less than that of the circumferential grooves 3 and the second intermediate land portion lug grooves 5C ranging from 0.4 mm to 1.5 mm, and a groove depth less than that of the circumferential grooves 3 and the second intermediate land portion lug grooves 5C, for example.

The second intermediate land portion narrow grooves 10 are disposed in a row as pairs in the tire circumferential direction between the second intermediate land portion lug grooves 5C disposed in a row in the tire circumferential direction and extend so as to intersect the tire circumferential direction. The second intermediate land portion narrow grooves 10 communicate with the third circumferential groove 3C and the fourth circumferential groove 3D adjacent in the tire lateral direction at both ends. The second intermediate land portion narrow grooves 10 refer to grooves that have a groove width less than that of the circumferential grooves 3 and the second intermediate land portion lug grooves 5C ranging from 0.4 mm to 1.5 mm, and a groove depth less than that of the circumferential grooves 3 and the second intermediate land portion lug grooves 5C, for example.

In such a manner, in the pneumatic tire 1 of the present embodiment, the second intermediate land portion 4C adjacent to the center land portion 4A in the tire lateral direction is further provided with the second intermediate land portion narrow grooves 9 that extend with a zigzag shape in the tire circumferential direction and have a smaller groove width than the circumferential grooves 3.

According to the pneumatic tire 1, the zigzag shape prevents collapse of the second intermediate land portion 4C in the tire lateral direction and improves the rigidity of the second intermediate land portion 4C. As a result, the effect of enhancing braking performance on dry road surfaces can be reinforced. Moreover, the edge effects are improved by the zigzag shape, so the effect of enhancing braking performance on snow-covered road surfaces can be reinforced.

Figure 4:
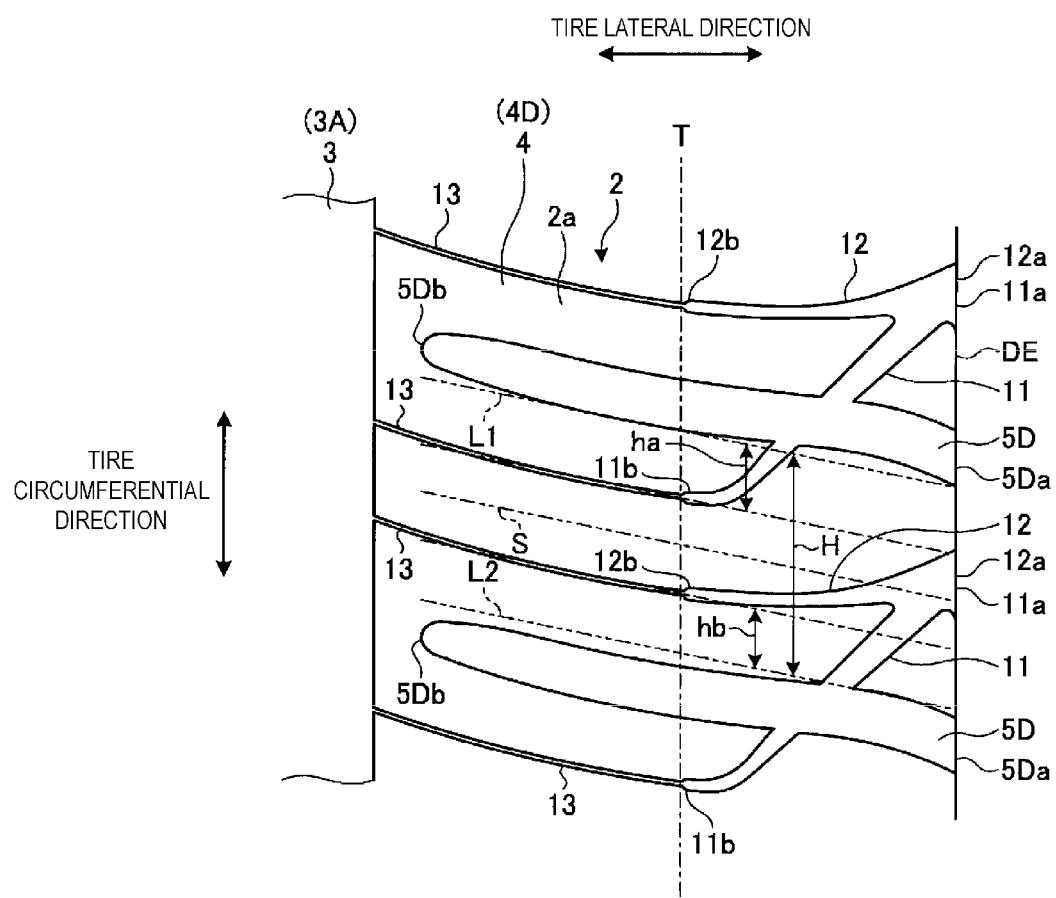
FIG. 4 is an enlarged plan view of a portion of a tread portion of a pneumatic tire according to an embodiment of the present technology.
Figure 5:
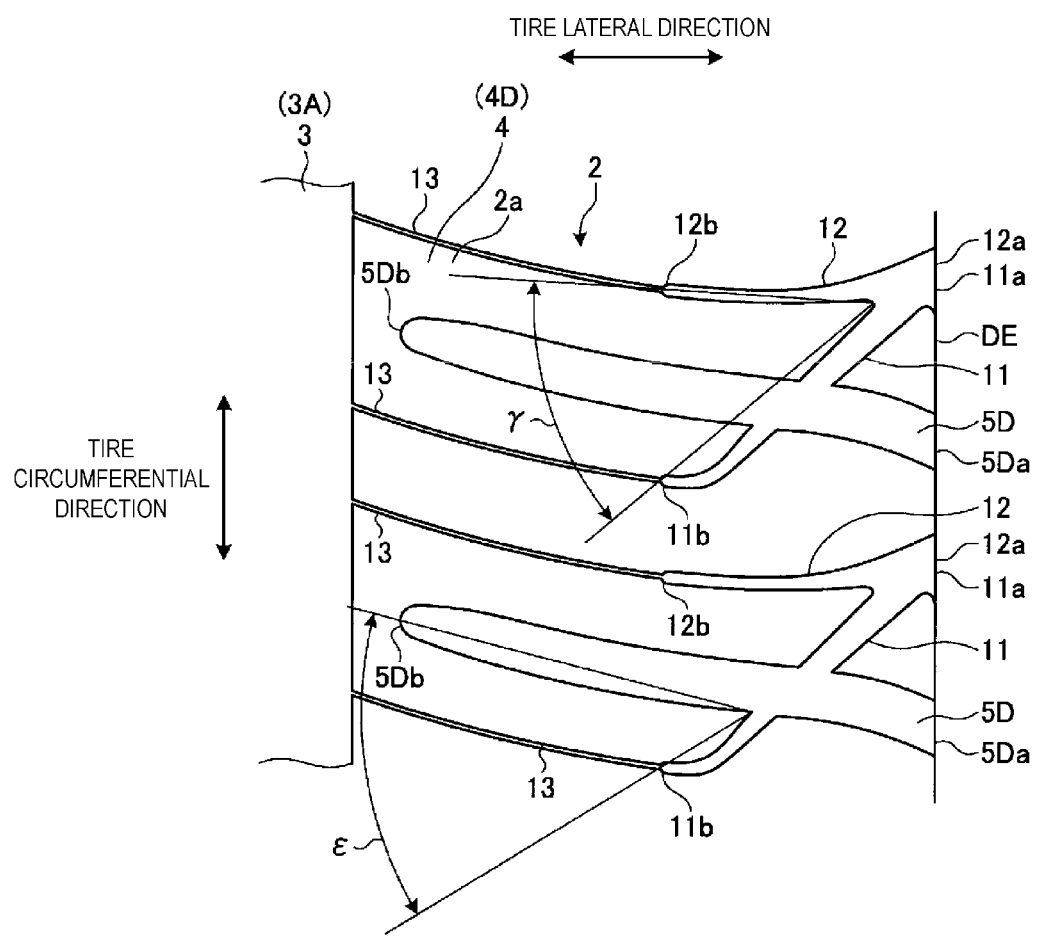
FIG. 5 is an enlarged plan view of a portion of a tread portion of a pneumatic tire according to an embodiment of the present technology.
Figure 6:
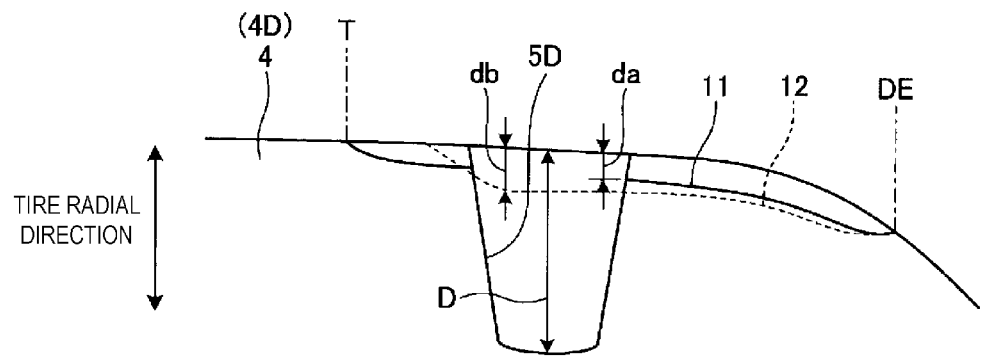
FIG. 6 is an enlarged cross-sectional view of a portion of a tread portion of a pneumatic tire according to an embodiment of the present technology.
Figure 7:
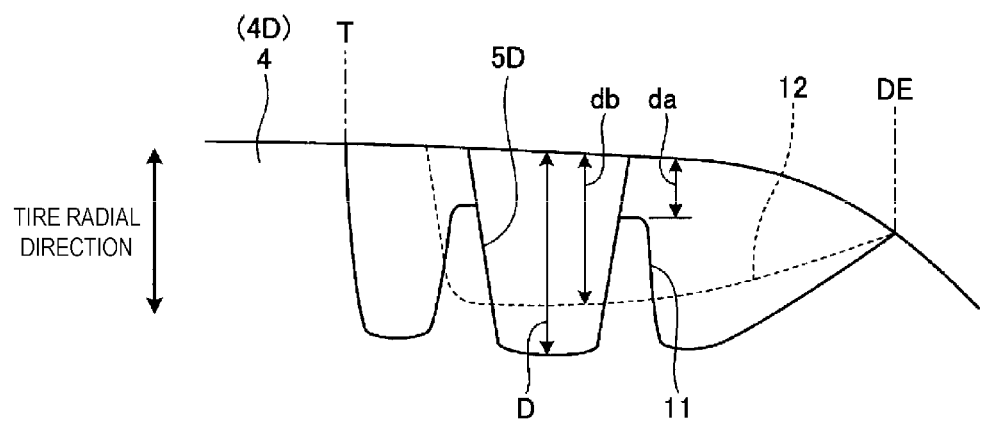
FIG. 7 is an enlarged cross-sectional view of a portion of a tread portion of a pneumatic tire according to an embodiment of the present technology.

FIGS. 4 and 5 are enlarged plan views of a portion of the tread portion of the pneumatic tire according to the present embodiment. FIGS. 6 and 7 are enlarged cross-sectional views of a portion of the tread portion of the pneumatic tire according to the present embodiment. FIGS. 4 to 7 are enlarged views of the first shoulder land portion 4D.

As illustrated in FIGS. 1 and 4, the first shoulder land portion 4D is provide with first shoulder land portion lug grooves 5D, intersecting narrow grooves 11, branch narrow grooves 12, and first shoulder land portion narrow grooves 13.

The first shoulder land portion lug grooves 5D intersect the tire circumferential direction so as to intersect the ground contact edge T. The first shoulder land portion lug grooves 5D open to the design end DE outward in the tire lateral direction at a first end 5Da and terminates within the first shoulder land portion 4D at a second end 5Db without communicating with the first circumferential groove 3A. The first shoulder land portion lug grooves 5D are disposed at intervals in the tire circumferential direction. Additionally, the first shoulder land portion lug grooves 5D extend substantially parallel with one another without intersecting. Note that, though not illustrated in the drawings, the first shoulder land portion lug grooves 5D may communicate with the first circumferential groove 3A at the second end 5Db.

The intersecting narrow grooves 11 intersect the first shoulder land portion lug grooves 5D at positions outward from the ground contact edges T in the tire lateral direction. The intersecting narrow grooves 11 open to the design end DE outward in the tire lateral direction at a first end 11a and terminate within the first shoulder land portion 4D at a second end 11b without communicating with the first circumferential groove 3A. In the present embodiment, preferably, the intersecting narrow grooves 11 terminate outward of the ground contact edges T in the tire lateral direction at the second end 11b, and all of each intersecting narrow groove 11 is located outward from the ground contact edges T. However, the second end 11b may terminate inward of the ground contact edge T in the tire lateral direction.

The branch narrow grooves 12 are disposed between the first shoulder land portion lug grooves 5D and branch from the intersecting narrow grooves 11. The branch narrow grooves 12 open to the design end DE outward in the tire lateral direction at a first end 12a and branches from the first ends 11a of the intersecting narrow grooves 11, and terminate within the first shoulder land portion 4D at a second end 12b without communicating with the first circumferential groove 3A. In the present embodiment, preferably, the branch narrow grooves 12 terminate outward of the ground contact edges T in the tire lateral direction at the second end 12b, and all of each branch narrow grooves 12 is located outward from the ground contact edges T. However, the second end 12b may terminate inward of the ground contact edge T in the tire lateral direction.

The first shoulder land portion narrow grooves 13 are provided from the first circumferential groove 3A to the second end 11b of the intersecting narrow grooves 11 terminating within the first shoulder land portion 4D. Additionally, the first shoulder land portion narrow grooves 13 are provided from the first circumferential groove 3A to the second end 12b of the branch narrow grooves 12 terminating within the first shoulder land portion 4D. In other words, the laterally inner end portions (second ends 11b, 12b) of the intersecting narrow grooves 11 and the branch narrow grooves 12 communicate with the first circumferential groove 3A via the first shoulder land portion narrow grooves 13.

Herein, in the present embodiment, first shoulder land portion lug grooves 5D refer to grooves that have a groove width from 1.5 mm to less than that of the circumferential grooves 3, and a groove depth less than that of the circumferential grooves 3, for example. The intersecting narrow grooves 11 and the branch narrow grooves 12 refer to grooves that have a groove width ranging from 0.4 mm to 1.5 mm and a groove depth less than that of the circumferential grooves 3 and the first shoulder land portion lug grooves 5D. The first shoulder land portion narrow grooves 13 refer to grooves that have a groove width equal to or less than that of the intersecting narrow grooves 11 and the branch narrow grooves 12 ranging from 0.4 mm to 1.5 mm and a groove depth less than that of the circumferential grooves 3 and the first shoulder land portion lug grooves 5D. Note that in embodiments in which the first shoulder land portion lug grooves 5D, the intersecting narrow grooves 11, the branch narrow grooves 12, and the first shoulder land portion narrow grooves 13 have a groove depth that changes, the deepest groove depth is taken for the range described above.

The first shoulder land portion narrow grooves 13 communicate with the intersecting narrow grooves 11 and the branch narrow grooves 12. However, for the groove width and the groove depth, the communicating portions are specified by a change in groove width. Additionally, the groove depth of the communicating portions of the first shoulder land portion narrow grooves 13 and the intersecting narrow grooves 11 and the branch narrow grooves 12 may be the same, or the groove depth of the intersecting narrow grooves 11 and the branch narrow grooves 12 may be deeper than that of the first shoulder land portion narrow grooves 13.

In such a manner, the pneumatic tire 1 of the present embodiment includes a tread surface 2a of the tread portion 2 provided with the first shoulder land portion 4D formed outermost from the first circumferential groove 3A in the tire lateral direction on the ground contact edge T, the first shoulder land portion 4D extending in the tire circumferential direction. The first shoulder land portion 4D is provided with a plurality of the first shoulder land portion lug grooves 5D in the tire circumferential direction that intersect the ground contact edge T, and intersecting narrow grooves 11 that intersect the first shoulder land portion lug grooves 5D outward of the ground contact edge T in the tire lateral direction.

According to the pneumatic tire 1, the intersecting narrow grooves 11 intersect the first shoulder land portion lug grooves 5D outward of the ground contact edge T in the tire lateral direction. As a result, when the pneumatic tire 1 is running on snow-covered road surfaces, the intersection portions of the first shoulder land portion lug grooves 5D and the intersecting narrow grooves 11 are present in the actual ground contact region widened outward in the tire lateral direction when the tire enters the snow. Thus, traction characteristics on snow-covered road surfaces can be improved and braking performance can be improved. Additionally, the intersection portions of the first shoulder land portion lug grooves 5D and the intersecting narrow grooves 11 are not present outside of the ground contact region when running on dry road surfaces, thus not effecting running on dry road surfaces and wet road surfaces. Furthermore, the groove depth of the intersecting narrow grooves 11 at least at the portion that intersects the first shoulder land portion lug groove 5D is shallow. As a result, a decrease in the rigidity of the first shoulder land portion 4D can be suppressed, and braking performance on dry road surfaces can be enhanced.

In the pneumatic tire 1 of the present embodiment, the first shoulder land portion 4D is provided with the branch narrow grooves 12 disposed outward of the ground contact edges T and between the first shoulder land portion lug grooves 5D. The branch narrow grooves 12 branch from the intersecting narrow grooves 11 and extend inward in the tire lateral direction.

According to the pneumatic tire 1, when the pneumatic tire 1 is running on snow-covered road surfaces, the branched portions of the intersecting narrow grooves 11 and the branch narrow grooves 12 are present in the actual ground contact region widened outward in the tire lateral direction when the tire enters the snow. Thus, traction characteristics on snow-covered road surfaces can be improved and braking performance can be further improved. Additionally, the branched portions of the intersecting narrow grooves 11 and the branch narrow grooves 12 are not present outside of the ground contact region when running on dry road surfaces, thus not effecting running on dry road surfaces and wet road surfaces.

In the pneumatic tire 1 of the present embodiment, the intersecting narrow grooves 11 and the branch narrow grooves 12 preferably terminate within the first shoulder land portion 4D at the inner end portion (second end) 11b, 12b in the tire lateral direction.

According to the pneumatic tire 1, by the intersecting narrow grooves 11 and the branch narrow grooves 12 terminating within the first shoulder land portion 4D, a decrease in the rigidity of the first shoulder land portion 4D can be suppressed, and an effect on braking performance on dry road surfaces can be suppress.

As illustrated in FIG. 4, in the pneumatic tire 1 of the present embodiment, the inner end portion (second end 11b) in the tire lateral direction of the intersecting narrow groove 11 is preferably disposed closer to the first shoulder land portion lug grooves 5D it intersects than a middle S between the first shoulder land portion lug grooves 5D adjacent in the tire circumferential direction. Furthermore, the inner end portion (second end 12b) in the tire lateral direction of the branch narrow groove 12 is preferably disposed closer to the first shoulder land portion lug grooves 5D intersected by the intersecting narrow groove 11 it branches from than the middle S between the first shoulder land portion lug grooves 5D adjacent in the tire circumferential direction.

The middle S between the first shoulder land portion lug grooves 5D adjacent in the tire circumferential direction is the center between first shoulder land portion lug grooves 5D adjacent in the tire circumferential direction and is indicated by a central line parallel with auxiliary lines L1, L2 that run along the groove edges closest to the first shoulder land portion lug grooves 5D.

According to the pneumatic tire 1, the second ends 11b, 12b of the intersecting narrow grooves 11 and the branch narrow grooves 12 are disposed closer to the first shoulder land portion lug grooves 5D than the middle S between adjacent first shoulder land portion lug grooves 5D. As a result, a decrease in the rigidity of the first shoulder land portion 4D between adjacent first shoulder land portion lug grooves 5D can be suppressed, even in embodiments including the intersecting narrow grooves 11 and the branch narrow grooves 12. This allows an effect on braking performance on dry road surfaces to be suppressed.

As illustrated in FIG. 4, the pneumatic tire 1 of the present embodiment preferably satisfies the relationships $0.1 H < ha < 0.5 H$ and $0.1 H < hb < 0.5 H$, where H is the distance in the tire circumferential direction between the first shoulder land portion lug grooves 5D adjacent in the tire circumferential direction (distance between the auxiliary lines L1, L2), ha is the distance in the tire circumferential direction between the inner end portion (second end 11 b) of the intersecting narrow groove 11 in the tire lateral direction and the auxiliary line L1 of the first shoulder land portion lug grooves 5D intersected by the intersecting narrow groove 11, and hb is the distance in the tire circumferential direction between the inner end portion (second end 12b) of the branch narrow groove 12 in the tire lateral direction and the auxiliary line L2 of the first shoulder land portion lug groove 5D intersected by the intersecting narrow groove 11 that the branch narrow groove 12 branches from.

Note that the auxiliary line L1 is the tangent line of the innermost opening edge of the first shoulder land portion lug groove 5D on the side of the inner end portion (second end 11b) of the intersecting narrow groove 11 in the tire lateral direction. The auxiliary line L2 is the tangent line of the innermost opening edge of the first shoulder land portion lug groove 5D intersected by the intersecting narrow groove 11 the branch narrow groove 12 branches from on the side of the inner end portion (second end 12b) of the branch narrow groove 12 in the tire lateral direction. The auxiliary lines L1, L2 are parallel with one another. The middle S described above is indicated by a straight line in the middle of the auxiliary lines L1, L2.

According to the pneumatic tire 1, the region between adjacent first shoulder land portion lug grooves 5D is divided into three by the intersecting narrow grooves 11 and the branch narrow grooves 12. As a result, a decrease in the rigidity of the first shoulder land portion 4D between first shoulder land portion lug grooves 5D can be suppressed, even in embodiments including the intersecting narrow grooves 11 and the branch narrow grooves 12. This allows an effect on braking performance on dry road surfaces to be suppressed.

As illustrated in FIG. 5, in the pneumatic tire 1 of the present embodiment, an angle γ formed by the intersecting narrow groove 11 and the branch narrow groove 12 that branches from the intersecting narrow groove 11 preferably satisfies the range $γ < 80°$.

As illustrated in FIG. 5, the angle γ, in a plan view of the tread portion 2, is the angle formed by a straight line joining the branch point of the branch narrow groove 12 from the intersecting narrow groove 11 and the end of the intersecting narrow groove 11 and a straight line joining the branch point of the branch narrow groove 12 from the intersecting narrow groove 11 and the end of the branch narrow groove 12.

According to the pneumatic tire 1, by the angle γ being less than 80°, the intersecting narrow grooves 11 and the branch narrow grooves 12 connect as wide grooves at the design ends DE of the tread portion 2. Accordingly, the connected portion is provided as a wide groove outside of the contact patch when the tire is running. This reduces heat build-up inside the tire, reduces tire rolling resistance, and enables good running of the tire. As a result, braking performance on dry road surfaces can be improved, and braking performance on snow-covered road surfaces can be improved. When the angle γ is 80° or greater, the opening angle of the branched portion is excessively large and come close to aligning with the tire circumferential direction. This results in low contribution to traction characteristics on snow-covered road surfaces and a low effect of improving braking performance. When the angle γ is less than 80°, a significant effect of improving braking performance can be obtained. Note that to obtain a more significant effect of improving braking performance, the angle γ more preferably ranges from 40° to 60°.

As illustrated in in FIG. 5, in the pneumatic tire 1 of the present embodiment, an angle formed by the intersecting narrow groove 11 and the first shoulder land portion lug groove 5D intersected by the intersecting narrow groove 11 inward in the tire lateral direction preferably satisfies the range $10° < ε < 90°$.

As illustrated in FIG. 5, the angle ε, in a plan view of the tread portion 2, is the angle formed by a straight line joining the intersection point of the intersecting narrow groove 11 to the first shoulder land portion lug groove 5D and the second end 5Db of the first shoulder land portion lug groove 5D and a straight line joining the intersection point of the intersecting narrow groove 11 to the first shoulder land portion lug groove 5D and the end of the intersecting narrow groove 11.

When the angle ε is 10° or less, an acute angle portion is formed at the intersection portion of the intersecting narrow groove 11 to the first shoulder land portion lug groove 5D. As a result, the intersection portion break off or other such damage may occur. When the angle ε is 90° or greater, the intersecting narrow groove 11 comes close to aligning with the tire circumferential direction. This results in low contribution to traction characteristics on snow-covered road surfaces and a low effect of improving braking performance. Accordingly, the angle ε preferably has the range $10° < ε < 90°$. Note that to obtain a more significant effect of improving braking performance on dry road surfaces and braking performance on snow-covered road surfaces, the angle ε more preferably has the range $40° < ε < 60°$.

Additionally, in the pneumatic tire 1 of the present embodiment, the intersecting narrow grooves 11 and the branch narrow grooves 12 preferably reduce in groove width inward in the tire lateral direction.

According to the pneumatic tire 1, by the intersecting narrow grooves 11 and the branch narrow grooves 12 reducing in groove width inward in the tire lateral direction, the intervals between the intersecting narrow grooves 11 and the branch narrow grooves 12 and the intervals between the intersecting narrow grooves 11 and the first shoulder land portion lug grooves 5D of the branch narrow grooves 12 are prevented from being narrow. As a result, a decrease in the rigidity of the first shoulder land portion 4D between first shoulder land portion lug grooves 5D can be suppressed, even in embodiments including the intersecting narrow grooves 11 and the branch narrow grooves 12. This allows an effect on braking performance on dry road surfaces to be suppressed.

In the pneumatic tire 1 of the present embodiment, at least one of the intersecting narrow grooves 11 or the branch narrow grooves 12 preferably communicate with the first circumferential groove 3A via the first shoulder land portion narrow grooves 13 at the inner end portion (second end 11$b$, 12$b$) in the tire lateral direction.

According to the pneumatic tire 1, by providing the first shoulder land portion narrow grooves 13, the flexibility of the first shoulder land portion 4D inward in the tire lateral direction from the inner end portion (second end 11$b$, 12$b$) of the intersecting narrow grooves 11 or the branch narrow grooves 12 in the tire lateral direction is improved. As a result, braking performance on snow-covered road surfaces can be improved. According to the pneumatic tire 1, by providing the first shoulder land portion narrow grooves 13, the edge effects improve braking performance on snow-covered road surfaces and the improvement in drainage properties improve braking performance on wet road surfaces.

As illustrated in FIGS. 6 and 7, the pneumatic tire 1 of the present embodiment preferably satisfies the range $da \leq 0.5$ D for the intersecting narrow grooves 11 and the first shoulder land portion lug grooves 5D intersected by the intersecting narrow grooves 11, where da is the groove depth of the intersecting narrow groove 11 at least at the intersection portion, and D is the groove depth of the first shoulder land portion lug groove 5D. Furthermore, as illustrated in FIGS. 6 and 7, the pneumatic tire 1 of the present embodiment preferably satisfies the range $db \leq 0.5$ D for the branch narrow grooves 12 and the first shoulder land portion lug grooves 5D adjacent to the branch narrow grooves 12 in the tire circumferential direction, where db is the groove depth of the branch narrow groove 12, and D is the groove depth of the first shoulder land portion lug grooves 5D.

FIGS. 6 and 7 are cross-sectional views taken along the extension direction of the intersecting narrow grooves 11 and illustrating different configurations of the intersecting narrow grooves 11 and the branch narrow grooves 12. The intersecting narrow groove 11 and the branch narrow groove 12 illustrated in FIG. 6 extend with approximately identical groove depths. The intersecting narrow groove 11 illustrated in FIG. 7 has a shallow groove depth caused by the groove depth being raised at the intersection portion with the first shoulder land portion lug groove 5D. The groove depth D of the first shoulder land portion lug groove 5D is the deepest groove depth at the intersection portion with the intersecting narrow groove 11. The groove depth da of the intersecting narrow groove 11 is the groove depth of the opening portion to the first shoulder land portion lug groove 5D on the deepest side at the intersection portion to the first shoulder land portion lug groove 5D. The groove depth db of the branch narrow groove 12 is the deepest groove depth of the branch narrow groove 12 itself, excluding the branched portion from the intersecting narrow groove 11.

When the ranges $da \leq 0.5$ D and $db \leq 0.5$ D of the intersecting narrow groove 11 and the branch narrow groove 12 are exceeded, the groove depth is excessively depth. As a result, the rigidity of the first shoulder land portion 4D between the first shoulder land portion lug grooves 5D with the intersecting narrow grooves 11 and the branch narrow grooves 12 is decreased, braking performance on dry road surfaces may be decreased, and damage such as portions breaking off may occur. Accordingly, the groove depth da, db of the intersecting narrow grooves 11 and the branch narrow grooves 12 are preferably in the ranges $da \leq 0.5$ D and $db \leq 0.5$ D. Note that the value of the groove depths da, db of the intersecting narrow grooves 11 and the branch narrow grooves 12 described above is preferably 2 mm or less.

As illustrated in FIG. 1, an embodiment in which the grooves 5D, 11, 12, 13 are disposed in only one shoulder land portion, the first shoulder land portion 4D, can obtained the effects described above. Also, though not illustrated in the drawings, an embodiment in which both shoulder land portions have such a configuration can obtain the effects described above.

As illustrated in FIG. 1, the second shoulder land portion 4E is provided with second shoulder land portion lug grooves 5E and second shoulder land portion narrow grooves 14.

A plurality of the second shoulder land portion lug grooves 5E are disposed in a row in the tire circumferential direction, each one extending so as to intersect the tire circumferential direction and intersect the ground contact edge T. The second shoulder land portion lug grooves 5E open to the design end DE outward in the tire lateral direction at one end and communicate with the fourth circumferential groove 3D at the other end. The second shoulder land portion lug grooves 5E refer to grooves that have a groove width from 1.5 mm to less than that of the circumferential grooves 3, and a groove depth less than that of the circumferential grooves 3, for example.

The second shoulder land portion narrow grooves 14 are disposed in a row as pairs in the tire circumferential direction between the second shoulder land portion lug grooves 5E disposed in a row in the tire circumferential direction and extend so as to intersect the tire circumferential direction and intersect the ground contact edge T. The second shoulder land portion narrow grooves 14 terminate without reaching the design end DE outward in the tire lateral direction at one end and communicate with the fourth circumferential groove 3D at the other end. The second shoulder land portion narrow grooves 14 refer to grooves that have a groove width less than that of the circumferential grooves 3 and the second shoulder land portion lug grooves 5E ranging from 0.4 mm to 1.5 mm, and a groove depth less than that of the circumferential grooves 3 and the second shoulder land portion lug grooves 5E, for example.

Outward of the ground contact edge T in the tire lateral direction, a pair of the second shoulder land portion narrow grooves 14 adjacent to the second shoulder land portion lug groove 5E communicate with each other via an auxiliary narrow groove 15 extending so as to intersect the second shoulder land portion lug groove 5E. The auxiliary narrow groove 15 refers to a groove that have a groove width less than that of the circumferential grooves 3 and the second shoulder land portion lug grooves 5E ranging from 0.4 mm to 1.5 mm, and a groove depth less than that of the circumferential grooves 3 and the second shoulder land portion lug grooves 5E, for example.

In such a manner, the pneumatic tire 1 of the present embodiment includes a tread surface 2$a$ of the tread portion 2 provided with the second shoulder land portion 4E formed outermost from the fourth circumferential groove 3D in the tire lateral direction on the ground contact edge T, the fourth circumferential groove 3D extending in the tire circumferential direction. The second shoulder land portion 4E is provided with a plurality of the second shoulder land portion lug grooves 5E in the tire circumferential direction that intersect the ground contact edge T, and the second shoulder land portion narrow grooves 14 disposed between adjacent second shoulder land portion lug grooves 5E that intersect the ground contact edge T and communicate with the fourth circumferential groove 3D.

According to the pneumatic tire 1, by providing the second shoulder land portion narrow grooves 14, the flexibility of the second shoulder land portion 4E is improved. As a result, braking performance on snow-covered road surfaces can be improved. According to the pneumatic tire 1, by providing the second shoulder land portion narrow grooves 14, the edge effects improve braking performance on snow-covered road surfaces and the improvement in drainage properties improve braking performance on wet road surfaces.

EXAMPLES

In the examples, performance tests for braking performance on wet road surfaces, braking performance on snow-covered road surfaces, and braking performance on dry road surfaces were performed on a plurality of types of pneumatic tires of different conditions (see FIGS. 8 and 9).

In these performance tests, pneumatic tires having a tire size of 205/55R16 were assembled on 16×6.5 JJ rims, inflated to the regular internal pressure (200 kPa), and mounted on a test vehicle (1600 cc, front engine front wheel drive vehicle).

Braking performance on wet road surfaces was evaluated by measuring the braking distance of the test vehicle from a speed of 100 km/h on a wet road surface test course with a water depth of 1 mm. Then, the measurement results were expressed as index values with the value of Conventional Example 1 assigned as the reference (100). In this evaluation, larger values are preferable.

The performance on snow-covered road surfaces was evaluated by measuring braking distance with ABS (anti-lock braking system) brakes of the test vehicle described above from a speed of 40 km/h on a snow-compacted road surface. Then, the measurement results were expressed as index values with the value of Conventional Example assigned as the reference (100). In this evaluation, larger values are preferable.

The performance on dry road surfaces was evaluated by measuring braking distance of the test vehicle described above from a speed of 100 km/h on a dry road surface test course. Then, the measurement results were expressed as index values with the value of Conventional Example assigned as the reference (100). In this evaluation, larger values are preferable.

As shown in FIGS. 8 and 9, the pneumatic tire test tire has a configuration including three circumferential grooves and two land portions provided in the tread surface.

The pneumatic tire of Conventional Example shown in FIG. 8 includes rib-like land portions without lug grooves. The pneumatic tire of Comparative Example includes rib-like land portions provided with terminating lug grooves.

The pneumatic tires of Examples 1 to 14 shown in FIGS. 8 and 9 include block-like land portions with main lug grooves, subsidiary lug grooves disposed between the main lug grooves, and circumferential narrow grooves that communicate with the main lug grooves and the subsidiary lug grooves. The pneumatic tires of Examples 2 to 14 include circumferential narrow grooves with a zigzag shape. The pneumatic tires of Example 3 to 14 include narrow grooves (corresponding to the narrow grooves 7). The pneumatic tires of Examples 4 to 14 have a specified tread surface area size relationship for $\beta1+\beta2$ to $\alpha$. The pneumatic tires of Examples 5 to 14 have a specified tread surface area size relationship for $\beta1$ and $\beta2$. The pneumatic tires of Examples 7 to 14 are provided with chamfered portions, either reversed with the chamfered portions forming the opening portions of the circumferential groove in a zigzag shape (see FIG. 3) or symmetrical with the chamfered portions forming the opening portions of the circumferential groove in a wedge shape (see FIG. 2). The pneumatic tires of Examples 9 to 14 have the configuration on the tire equatorial plane including a land portion. The pneumatic tires of Examples 10 to 14 include main lug grooves that decrease in groove width toward the laterally central circumferential groove. The pneumatic tires of Examples 11 to 14 include subsidiary lug grooves that decrease in groove width toward the laterally central circumferential groove. The pneumatic tires of Examples 12 to 14 have a specified groove width for the narrow grooves.

As can be seen from the test results of FIGS. 8 and 9, the pneumatic tires of Examples 1 to 14 have enhanced braking performance on dry road surfaces, wet road surfaces, and snow-covered road surfaces.

The invention claimed is:
1. A pneumatic tire, comprising:
a tread surface of a tread portion comprising
three circumferential grooves disposed side by side in a tire lateral direction extending in a tire circumferential direction;
two land portions disposed side by side in the tire lateral direction defined by the circumferential grooves;
a plurality of main lug grooves disposed in a row in the tire circumferential direction extending so as to intersect the tire circumferential direction, the plurality of main lug grooves each communicating with a pair of the circumferential grooves adjacent in the tire lateral direction at both ends to form the land portions into blocks;
a plurality of subsidiary lug grooves disposed between pairs of the plurality of main lug grooves disposed in a row in the tire circumferential direction extending so as to intersect the tire circumferential direction, the plurality of subsidiary lug grooves each communicating with the circumferential groove located centrally at one end and terminating within the land portions at the other end; and
a plurality of circumferential narrow grooves disposed in the land portions extending in the tire circumferential direction, the plurality of circumferential narrow grooves each communicating with a main lug groove at one end and communicating with a subsidiary lug groove at the other end;
the land portions being defined by the circumferential grooves and the plurality of main lug grooves to form intra-land portions divided in the tire circumferential direction;
the intra-land portions being divided by the laterally outer circumferential grooves, the plurality of main lug grooves, and the plurality of circumferential narrow grooves to form a long small land portion, which is long in the tire circumferential direction;
the intra-land portions being divided by the laterally central circumferential groove, the plurality of main lug grooves, the plurality of subsidiary lug grooves, and the plurality of circumferential narrow grooves to form two short small land portions, which are short in the tire circumferential direction;

the plurality of circumferential narrow grooves comprising a first circumferential narrow groove that communicates with one main lug groove partway along at one end and communicates with the subsidiary lug groove partway along at the other end, and a second circumferential narrow groove that communicates with another main lug groove partway along at one end and communicates with the subsidiary lug groove at a terminating end thereof at the other end;

one end of the first circumferential narrow groove and one end of another second circumferential narrow groove facing one another and communicating via the one main lug groove; and the first circumferential narrow groove and the second circumferential narrow groove including a portion of the subsidiary lug groove and having a zigzag shape in the tire circumferential direction.

2. The pneumatic tire according to claim 1, wherein the intra-land portions comprise a narrow groove in the tread surface of the long small land portion.

3. The pneumatic tire according to claim 2, wherein in the intra-land portions, a relationship $\alpha<\beta1+\beta2$ is satisfied, where a is a tread surface area of the long small land portion, and $\beta1$, $\beta2$ are tread surface areas of the short small land portions.

4. The pneumatic tire according to claim 3, wherein
a rotation direction when the tire is mounted on a vehicle is designated; and
in the intra-land portions, a relationship $\beta1<\beta2$ is satisfied, where the tread surface area $\beta1$ of one of the two short small land portions is on a leading side, and the tread surface area $\beta2$ of the other of the two short small land portions is on a trailing side.

5. The pneumatic tire according to claim 4, further comprising chamfered portions on opening edges of the laterally central circumferential groove between pairs of the main lug grooves adjacent in the tire circumferential direction, the chamfered portions changing positions of the opening edges diagonally in the tire circumferential direction.

6. The pneumatic tire according to claim 5, wherein one of the land portions is disposed on a tire equatorial plane.

7. The pneumatic tire according to claim 6, wherein the plurality of main lug grooves decrease in groove width toward the laterally central circumferential groove.

8. The pneumatic tire according to claim 7, wherein the plurality of subsidiary lug grooves decrease in groove width toward the laterally central circumferential groove.

9. The pneumatic tire according to claim 8, wherein
end portions of the plurality of main lug grooves that communicate with the laterally central circumferential groove are offset in position in the tire circumferential direction; and end portions of the plurality of subsidiary lug grooves that communicate with the laterally central circumferential groove are offset in position in the tire circumferential direction.

10. The pneumatic tire according to claim 9, wherein the narrow grooves have a groove width ranging from 0.4 mm to 1.2 mm.

11. The pneumatic tire according to claim 1, wherein in the intra-land portions, a relationship $\alpha<\beta1+\beta2$ is satisfied, where a is a tread surface area of the long small land portion, and $\beta1$, $\beta2$ are tread surface areas of the short small land portions.

12. The pneumatic tire according to claim 1, wherein
a rotation direction when the tire is mounted on a vehicle is designated; and
in the intra-land portions, a relationship $\beta1<\beta2$ is satisfied, where the tread surface area $\beta1$ of one of the two short small land portions is on a leading side, and the tread surface area $\beta2$ of the other of the two short small land portions is on a trailing side.

13. The pneumatic tire according to claim 1, further comprising chamfered portions on opening edges of the laterally central circumferential groove between pairs of the main lug grooves adjacent in the tire circumferential direction, the chamfered portions changing positions of the opening edges diagonally in the tire circumferential direction.

14. The pneumatic tire according to claim 1, wherein one of the land portions is disposed on a tire equatorial plane.

15. The pneumatic tire according to claim 1, wherein the plurality of main lug grooves decrease in groove width toward the laterally central circumferential groove.

16. The pneumatic tire according to claim 1, wherein the plurality of subsidiary lug grooves decrease in groove width toward the laterally central circumferential groove.

17. The pneumatic tire according to claim 1, wherein end portions of the plurality of main lug grooves that communicate with the laterally central circumferential groove are offset in position in the tire circumferential direction.

18. The pneumatic tire according to claim 1, wherein end portions of the plurality of subsidiary lug grooves that communicate with the laterally central circumferential groove are offset in position in the tire circumferential direction.

19. The pneumatic tire according to claim 1, wherein the narrow grooves have a groove width ranging from 0.4 mm to 1.2 mm.

* * * * *